July 6, 1926.
H. RODMAN
METHOD OF MAKING ACTIVATED CARBON
Filed August 21, 1918
1,591,235
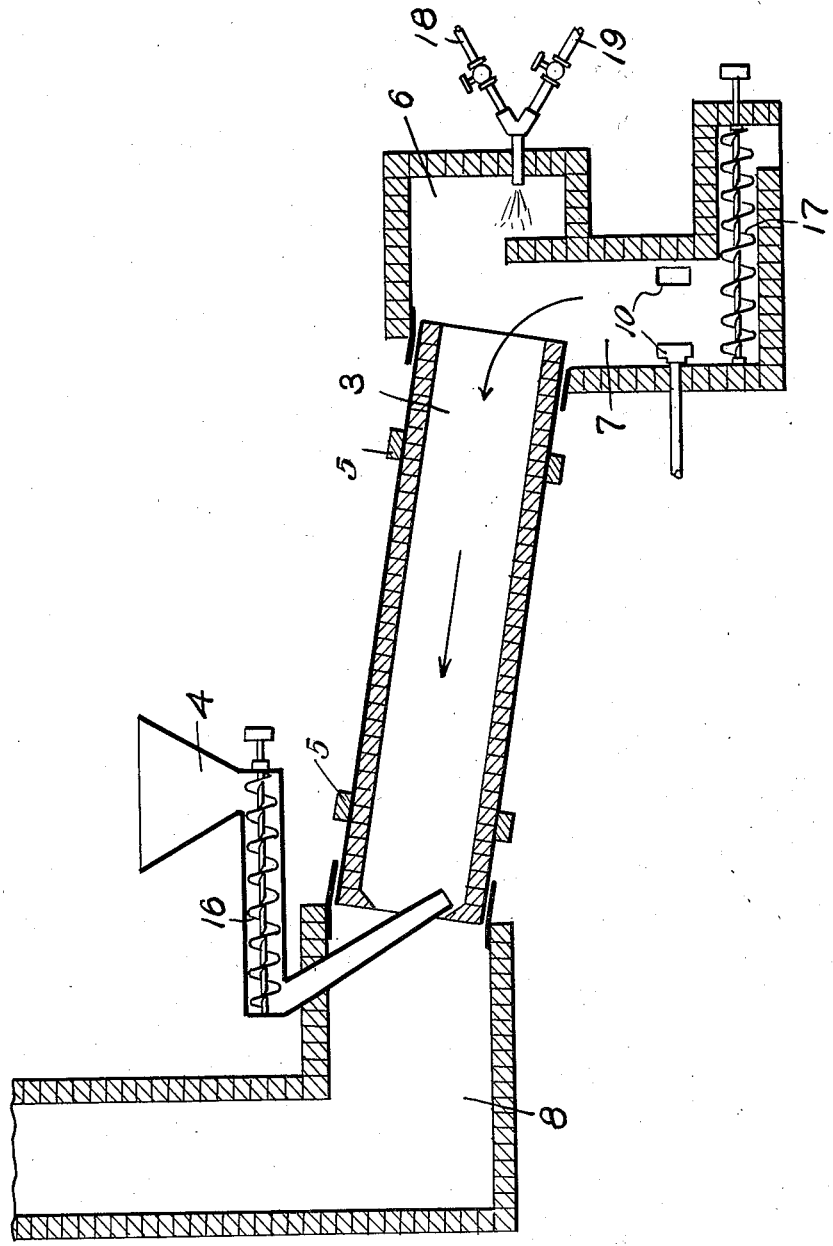
WITNESSES
J. Herbert Bradley.
INVENTOR
Hugh Rodman
by E. W. McCallister
his attorney in fact.

Patented July 6, 1926.

1,591,235

UNITED STATES PATENT OFFICE.

HUGH RODMAN, OF OAKMONT, PENNSYLVANIA, ASSIGNOR TO RODMAN CHEMICAL COMPANY, A CORPORATION OF PENNSYLVANIA.

METHOD OF MAKING ACTIVATED CARBON.

Application filed August 21, 1918. Serial No. 250,850.

This invention relates to the manufacture of activated carbon and discloses a new and improved method of manufacturing such carbon.

In order to make the nature of the invention clear, so that any one skilled in the art may be able to practice my invention, I will first describe what is meant by activated carbon, then I will describe the ordinary method of producing such carbon, and finally I will describe the improved method herein set forth as an embodiment of my invention.

By activated carbon is meant a commercial product which has unusual ability to absorb gases and to clarify liquors, and which is produced in a well known way. This activated carbon is not to be confused with ordinary carbon, such as charcoal or coke, which have little or no activity of the kind indicated, nor with bone black and other charred animal matters which have more activity than ordinary charcoal, but which are not nearly so active as the carbons produced as hereafter described. The activity of the animal chars, moreover, seems to depend upon a specific nitrogenous char; whereas, so far as I know, the activity of commercial activated chars is dependent upon the formation of a peculiarly pure form of carbon only.

The usual and well known way of producing activated chars consists in crushing vegetable chars, such as ordinary wood charcoal, or nut husk charcoal to the size desired (which may be about one-sixteenth inch in through dimension) and then packing this crushed char in tubes or other receptacles which are externally heated and through which is blown a stream of activating gas, generally superheated steam. When the carbon is heated to about 900 degrees centigrade and steam of the same temperature is passed over it, a reaction occurs (the well known water gas reaction) lowering the temperature of the two materials, forming carbon monoxide and hydrogen and, in some way not well understood, activating the remaining char. By some, it is held that the activation is due to the elimination of chemically bound hydrogen which is found in all ordinary commercial charcoal and the consequent production of chemically pure carbon. By others, it is held that the steam reacts with certain vulnerable portions of the char, leaving tubes or pores of definite size which are the source of the activity developed. Whatever the true explanation, and I am far from wishing to dogmatize, the fact remains that carbons treated in this way, have unusual properties in the way of decolorizing solutions, absorbing gases, etc. They are specially applicable to the purpose of filling gas masks, clarifying oils and sugar solutions, absorbing odors etc., and form a valuable commercial article.

Various forms of apparatus have been developed and suggested for carrying on the activating of char on a commercial scale, and various gases have been used or suggested as the activating agent (such as ammonia, chlorine, steam, air etc.), but I believe that without exception, it has always been the practice to enclose the char in an externally heated chamber and pass the activating gas through this chamber and about the char fragments. In fact, most of the written descriptions of existing apparatus contain cautions against allowing the char, during or after treatment, to come into contact with the open air.

Now this method of heating char in enclosed tubes or chambers is costly and inefficient for two reasons. The first is that the heat must all be passed through the walls of the chamber, entailing the losses common to such indirect heating. The second is that the reactions within the tubes or chambers are generally endothermic, and it is therefore very difficult to heat any but small tubes successfully, as the heat absorbed by the reaction will lower the temperature of the inner part of the carbon mass (the carbon furthest from the walls of the chamber) to a point where the reaction ceases.

I have found that these difficulties may be easily overcome and a number of advantages secured by heating the char in the direct heat of combustion developed by burning fuel, preferably in an ordinary rotary kiln, and I will now describe this method of activating chars and call attention to the advantages incident thereto.

In the first place I find that, contrary to common practice and belief, chars can be activated in contact with the ordinary products of fuel combustion quite as readily and completely as by the older methods. I find also that, contrary to common belief, these chars are not injured by contact with those gases and ordinary air, provided care is taken to see that the char is not actually consumed.

I find, further, that the carbon produced by this method is generally harder than that produced by the older method of steam blowing in an externally heated tube. I find further, that activated chars of superior quality can be produced at much lower cost than by the old method, and that the chars are remarkably uniform in quality, as the stirring and tumbling in the kiln prevents the formation of gas pockets, which ordinarily give trouble in the older devices. The single sheet of drawing accompanying and forming a part hereof illustrates a form of apparatus which may be employed in carrying out my invention.

The method outlined, is susceptible of various modifications without departing from the scope of the invention, which broadly consists in heating chars to a reacting temperature in the direct products of combustion. It will be observed that the ordinary products of fuel combustion consist of nitrogen and carbon dioxide, with smaller quantities of steam and carbon monoxide depending upon the fuel used and the completeness of combustion obtained. It is my belief that the carbon dioxide and the steam are the activating agents, and it is well known that these two materials coming into contact with highly heated carbon, produce an endothermic reaction resulting in carbon monoxide and hydrogen. It is evident that by the use of my method of activating that the fuel may be burned so as to produce gases having much higher temperatures than that necessary for activating (about 900 to 1000 cent.), and that these gases, coming into contact with char at 900 or 1000 cent., will react with the char without reducing its temperature, notwithstanding the heat absorption due to the endothermic reaction. In this way, then, I am enabled to easily maintain my char at the temperature desired for reaction and to continue its activation as long as desired.

I prefer to use a rotary kiln and to so regulate the passage of material through the kiln, that the material will be in the activating zone for an hour or more. This can be done by adjusting the slope of the kiln or by damming up the discharge end of the kiln, (but of course to a less extent than the feed end) and maintaining the kiln in a horizontal position. By damming or constricting the ends of the kiln as indicated, a much greater quantity of material can be treated at one time.

The kiln can be revolved in any ordinary way and the material fed into it in any way desired, as by a screw conveyor. At the discharge end I prefer to allow the activated material to fall into a brick well, where it is cooled by contact with a water spray or steam, care being taken to see that the material is not actually wet. It is apparent that the hot material being cooled by the steam or water spray, will react to some extent (the water gas reaction) and will be activated to that extent. This effect is, however, small as the cooling effect of the endothermic reaction soon, lowers the temperature to a point where no further reaction will take place. The steam and other gases arising from the cooling well can be passed through the kiln if desired, and the cooled char removed from the well in any convenient way, as by a screw conveyor.

The gases formed by the activating reaction within the kiln, will consist largely of carbon monoxide, hydrogen and nitrogen. These can be burned at the mouth of the kiln to produce steam for power purposes or used in other ways. The steam developed in this way may be used for cooling the activated carbon.

The apparatus generally described above is illustrated in the single sheet of drawing accompanying and forming a part hereof. Fuel, such as oil or gas, is burned in the furnace 6 which communicates directly with the lower end of an inclined kiln 3 through which the carbon to be activated is passed. The oil or gas burner associated with this furnace 6 is diagrammatically shown and is associated with an oil or gas pipe 18 having a control valve and an air delivery pipe 19 which is also provided with a control valve. The kiln is provided with the usual firebrick lining and may be supported on rings 5 by means of rollers or in any other way which will facilitate its rotation. It may be rotated by any approved means such for example as are usually employed for rotating cement kilns. The material to be activated may be fed into the upper end of the kiln in any desired way as by a screw conveyor 16 which communicates with a hopper 4. The hot gases, after traversing the kiln, are delivered to a stack 8 which communicates with the upper end of the kiln. The material delivered from the conveyor 16 is discharged into a brick well 7 after it is passed through the kiln and has been subjected to the hot gases traversing the kiln.

I have diagrammatically shown sprays or nozzles 10 located within the well 7 for delivering water spray or steam to the carbon particles contained therein and discharged from the rotating kiln. As above stated, either steam or water spray may be used in cooling the material in the well, care being taken to see that the material is not actually wet. The well is so arranged with relation to the lower or discharge end of the kiln that the steam and other gases arising from it pass through the kiln with the hot combustion gases from the furnace. Any suitable means may be employed for removing the cooled material from the well and I have illustrated a screw conveyor 17 for accomplishing this result. It will of course be apparent that the oil or gas furnace illustrated may be replaced by any other type of furnace or one in which ordinary fuel such as coal is burned.

The character of the fuel for developing the hot activating gases is of less importance than the manner of burning the fuel. It is desirable, though not essential, that the fuel be completely burned before the hot gases reach the char to be activated, as any unburned hydro-carbon gases may injure the activated material, or lessen its activity. For this reason I prefer to have a large fire box or furnace and to burn the fuel with a slight excess of air, so as to insure complete combustion and the absence of any flame in the activating kiln.

It is obvious that the excess air, or oxygen, passing into the activating kiln along with the burned hot gases, will react with the hot carbon, first producing carbon dioxide and then, by further reduction, carbon monoxide. In this way heat will be developed and some activation accomplished, but, obviously, at the expense of burning the char as fuel. This is objectionable for two reasons, first because the treated char is generally much more expensive than ordinary fuel, and second because the hot oxygen generally reacts more vigorously than carbon dioxide with the hot carbon (an exothermic reaction as against an endothermic reaction) with a constant consumption of the outer layers of the char fragment, which outer layers are the most active and valuable. In fact, it will be observed, that the method of activating described and claimed in this application, permits of the use of a device like a rotary kiln in which the carbon to be activated furnishes its own fuel, part of the carbon being burned completely, in order to furnish heated gases to activate the remaining part. This is, however, not so advantageous as the burning of separate fuel in the fire box outside the kiln, partly because a separate fire permits the use of cheaper fuel, partly because of the necessity of raising all of the carbon to a temperature considerably about 1000 cent., and partly because of the too vigorous attack of the free oxygen upon the hot char, with the consequent burning off of the activated shell.

It will be noted that in the older method of activating in externally heated tubes or chambers, when air was used as the activating gas, there was also this same complete combustion of certain parts of the char; but in this method, the quantity of air admitted was so small as not to constitute an important factor in the heat obtained, the greater part of the heat coming from the externally heated walls of the tube.

The particular method of carrying out my invention described in this application is the best I know of, but I do not wish to be limited to this particular arrangement of apparatus. I believe the rotary kiln is the best means of accomplishing the stirring of the material, together with its passage through and out of the heated zone, but I do not wish to be limited to rotary kilns, as other devices may serve the same purpose and the operation still fall within the spirit and scope of my invention as set forth by the appended claims.

The length of treatment and temperature to which the char is subjected, will depend upon the use to which the char is to be put and the character of the char itself. It is more difficult to activate dense chars than porous chars, other conditions being equal, and more difficult to activate large fragments than small ones, as the activation is a progressive action starting at the surface of the fragment and gradually working toward the center. I have found that chars for absorbing gases require a different length of treatment from those for clarifying oils. It is, therefore, difficult to give a general rule for operating the kiln or other activating device. However, I may say, that excellent results are obtained by agitating the material gently for two hours at a temperature of about 1000 degrees cent., while in contact with thoroughly burned gases. I believe the materials obtained in this way are not only more highly active, but are also stronger mechanically than similar material blown with steam in accordance with the old method in which externally heated tubes or receptacles are employed. It may be noted that the effect of activating, no matter how carried out, is to generally weaken the structure of the char, leaving it of lower specific density and blacker in color.

The preliminary treatment of the chars subjected to the activating reaction, is of considerable importance, but I believe less important where my improved process is employed than where the externally heat tube process is employed. In my opinion this is due to the fact that, in the directly heated rotary kiln, which may be employed in carrying out my improved process, the gases leaving the furnace and passing into the kiln are progressively cooled, in no place coming into contact with char hotter than the gas itself. In this way the formation of deposited carbon (similar to the retort carbon formed in ordinary gas retorts) is overcome. The formation of retort carbon upon the surface of the char fragments is generally held to be harmful.

I have used the device herein described to activate natural chars, such as wood charcoal and nut chars, as well as various naturally occurring carbons, such as coals and lignites. I have also used it to activate artificial chars made by mixing finely ground carbon with a binding agent and forming small balls which can then be charred and activated. I have activated chars in this way which have been charred in separate charring devices, and also those which have been charred simply by passing them through the kiln, the charring of the raw material taking place near the feed end of the kiln and the activating taking place further along towards the fire box or furnace. The material which I have done most work upon, is the weathered, or as I have termed it, rotted coal existing at the contact of the Pittsburgh seam of coal with the surface of the hills, and with this material I find it possible to feed the sized raw material into the kiln and do both the charring and the activating in one operation.

I find that the effective stirring and easy handling possible with the rotary kiln, makes it possible to produce activated chars of superior character and at greatly reduced cost, even where the heat used is indirect. For instance, I may use ordinary fuel to produce hot gases, pass these gases through a brick checker work so as to produce highly heated walls, then discontinue the passing of the hot gases and instead pass other gases, say steam, which will be highly heated in contact with the hot brick, the hot steam being then passed through the rotary kiln to activate the carbon. It will be observed that the water gas formed in the rotary kiln by the contact of the hot steam and hot carbon may be used as fuel to heat the brick checker work. It will be apparent that several, or at least two, systems of checker work will be necessary for continuous work, one being used for the heating of the steam, while one or more are being heated by the burning fuel after having been cooled by contact with a previous lot of steam. It should be noted that the hot steam, or any other fluid used for the purpose, must contain enough heat to heat the carbon and also take care of the absorption of the heat due to the endothermic reaction, and still leave the carbon at about the activating temperature, that is above 1650 degrees Fahr. It will generally be found necessary to have the gases above 2000 degrees Fahr. where they enter the rotary kiln.

What I claim is:

1. The method of activating carbon which consists in heating it to an activating temperature by direct contact with the hot gases derived from burning fuel and agitating the carbon.

2. The method of activating carbon which consists in heating it to an activating temperature in a rotating kiln by subjecting it to direct contact with the hot gases derived from burning fuel and in passing the carbon slowly through the rotating kiln.

3. The method of activating carbon which consists in passing it through a rotating kiln in direct contact with combustion gases so hot that after the endothermic reaction with the carbon, the carbon will still be at the activating temperature.

4. The method of making activated carbonaceous material which consists in agitating a mass of carbonaceous particles and in simultaneously heating the mass to an activating temperature by subjecting it to the direct heat of products of combustion passing over and through it.

5. The method of activating carbon, which consists in tumbling a mass of carbon fragments and in heating the tumbling mass to an activating temperature by subjecting it to direct contact with hot products of combustion by passing the products of combustion over and through the tumbling mass.

6. The method of activating carbon, which consists in agitating a mass of carbon fragments, and in heating the agitated mass to an activating temperature by so subjecting it to direct contact with hot products of combustion, that cooler particles of the mass are subjected to the cooled activating fluid.

7. The method of activating carbon, which consists in slowly passing carbon through a rotating kiln and in heating and activating the carbon traversing the kiln by subjecting it to direct contact with hot gaseous products of combustion passing through the kiln and delivered to the kiln at such a temperature as to promote an endothermic reaction within the kiln, and maintain carbon passing through the kiln at an activating temperature.

8. The method of making activated carbon, which consists in feeding carbonaceous material into a kiln, in carbonizing the material within the kiln, and in activating the carbonized material within the kiln by passing hot gaseous products of combustion through the kiln in contact with the material while agitating the material.

9. The method of activating carbon, which consists in agitating a mass of carbon fragments within a receptacle, heating and activating the agitated mass by subjecting it to direct contact of hot gaseous products of combustion passing through the receptacle, discharging activated carbon from the receptacle and cooling the carbon discharged.

10. A process of treating carbon by oxidation, which comprises, continuously agitating the carbon while conveying it through a reaction zone and subjecting the carbon while in said zone to the combined action of steam and hot combustion gases, the latter gases furnishing the necessary heat to maintain the temperature at a point insuring rapid activation of the carbon.

11. A process of treating carbon by oxidation, which comprises, continuously agitating the carbon while conveying it through a reaction zone and subjecting the carbon while in said zone to the combined action of steam and hot combustion gases, the latter gases furnishing the necessary heat to maintain a temperature of between 700 degrees C. and 1100 degrees C.

In testimony whereof, I have hereunto subscribed my name this 16th day of August, 1918.

HUGH RODMAN.